(No Model.) 5 Sheets—Sheet 5.
R. EICKEMEYER.
HAT STRETCHING MACHINE.
No. 256,203. Patented Apr. 11, 1882.
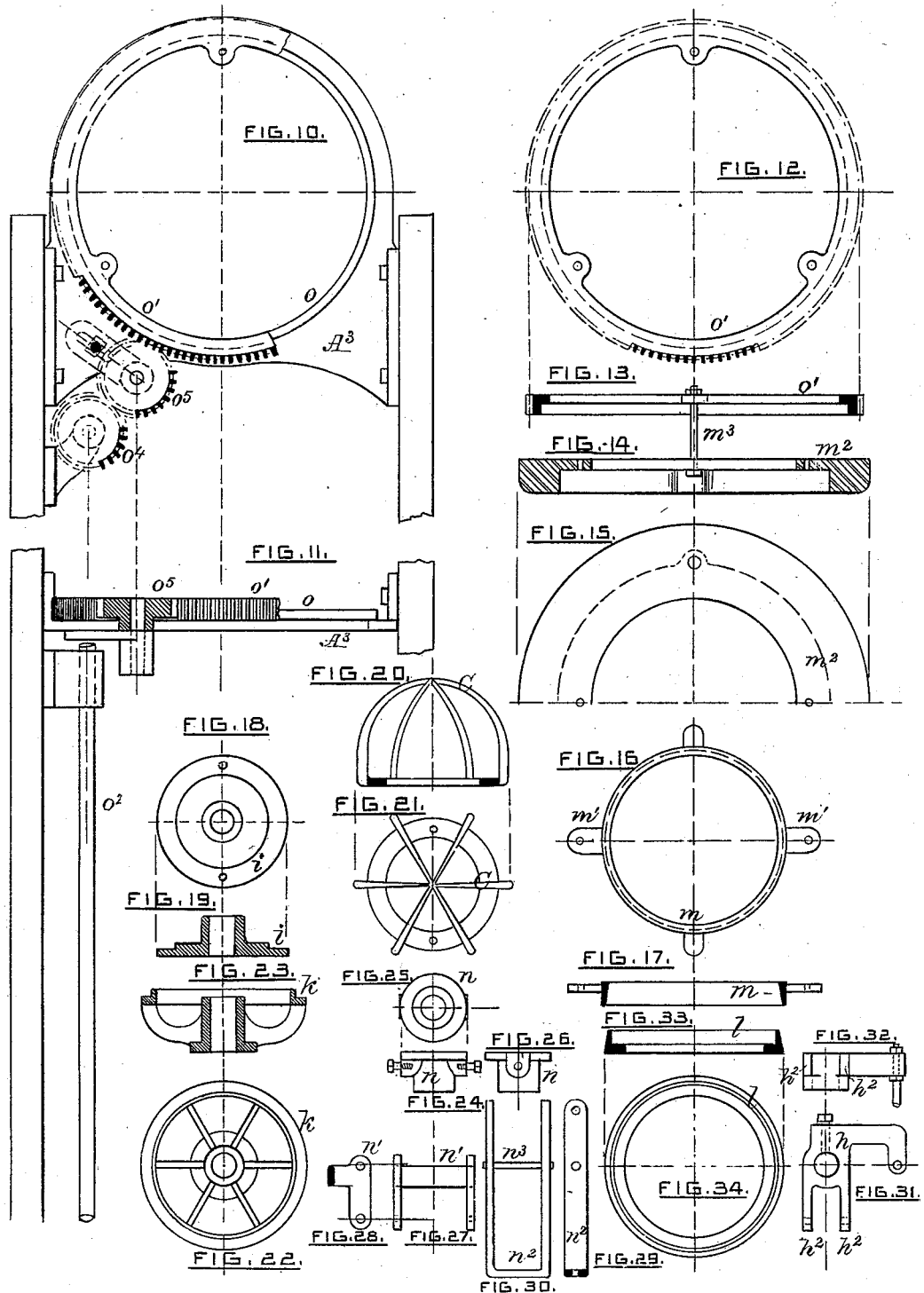
ATTEST:
Philip F. Larner
Howell T. Bartle
INVENTOR:
Rudolf Eickemeyer
By Wm C. Wood
Attorney

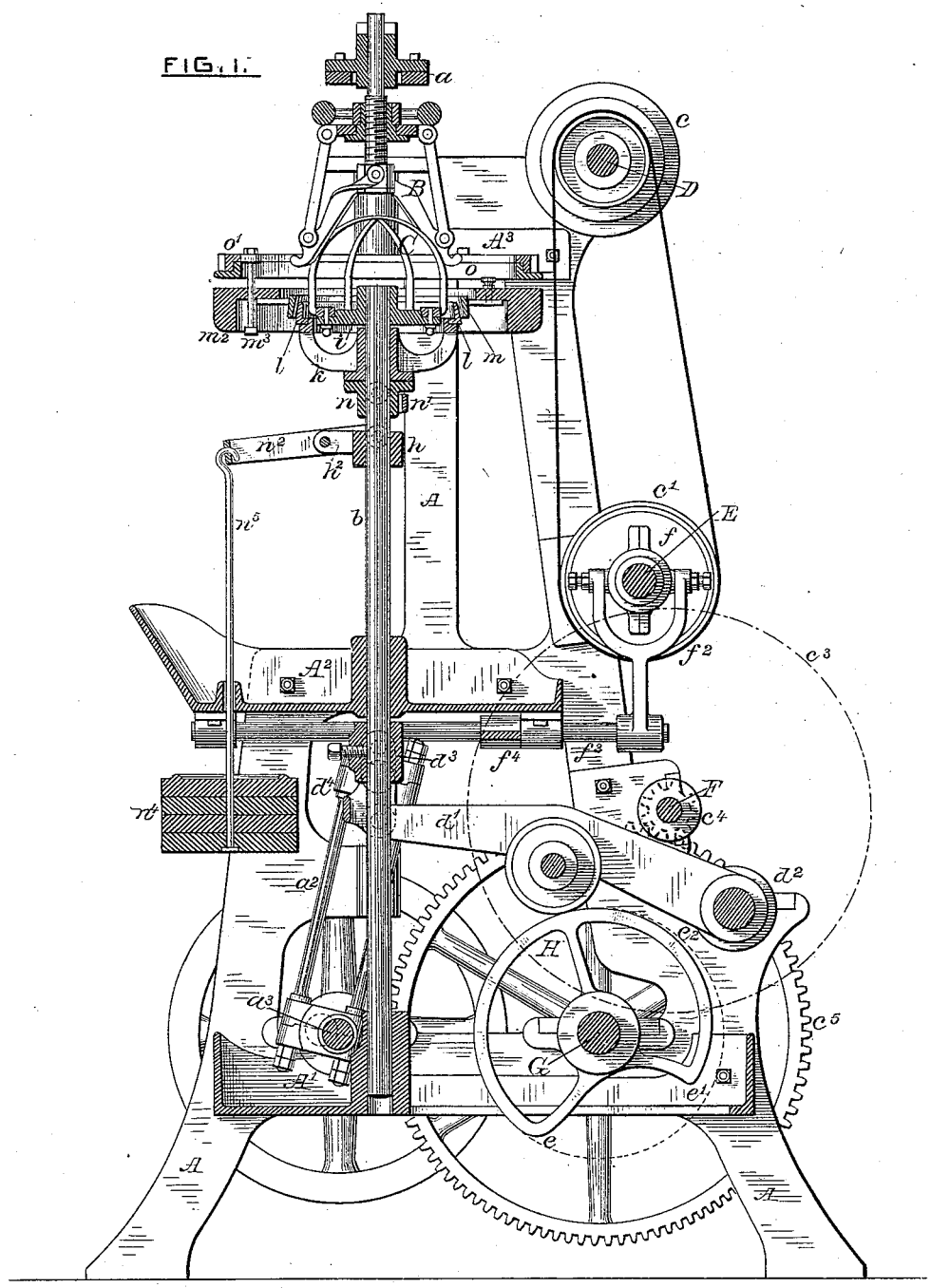

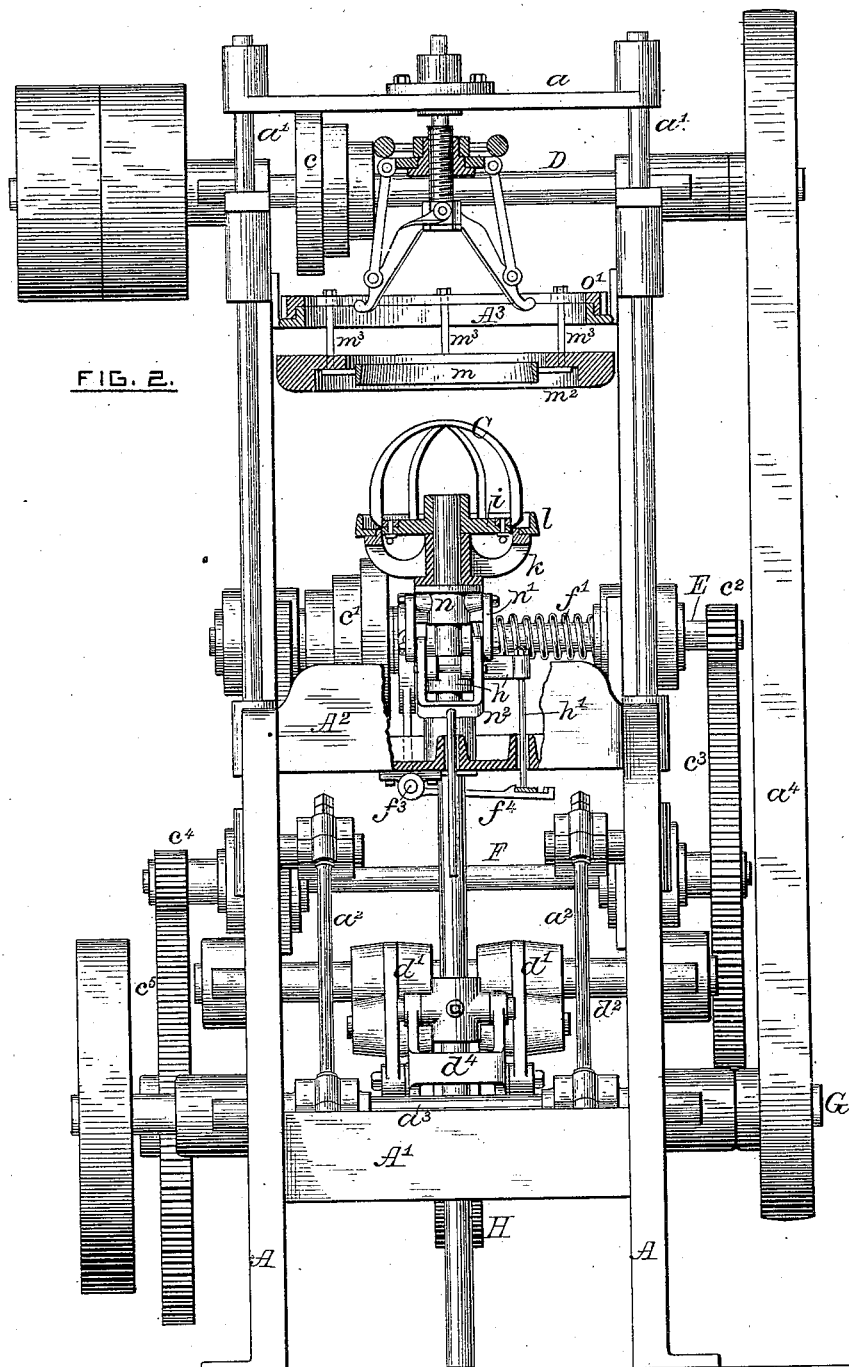

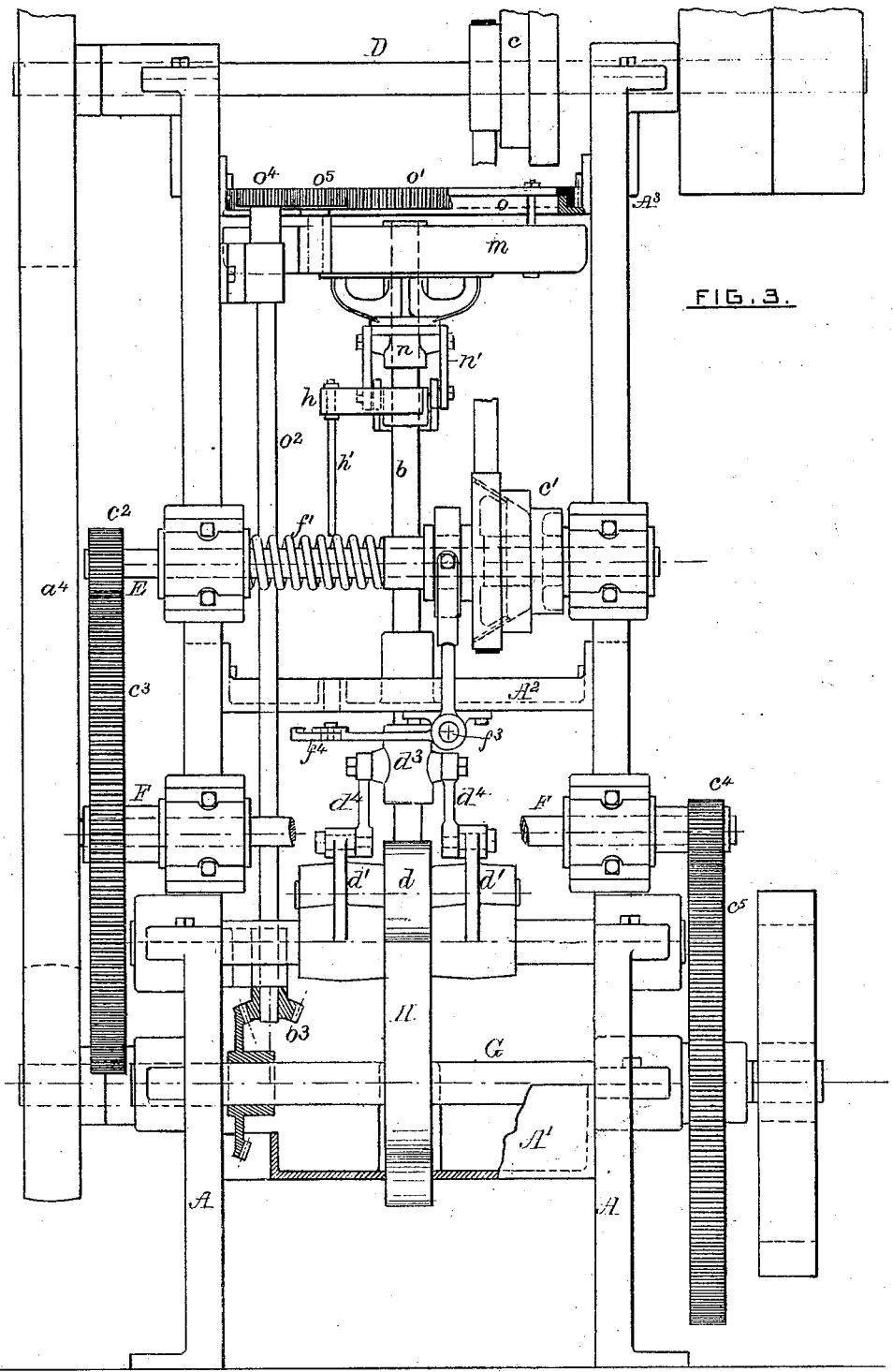

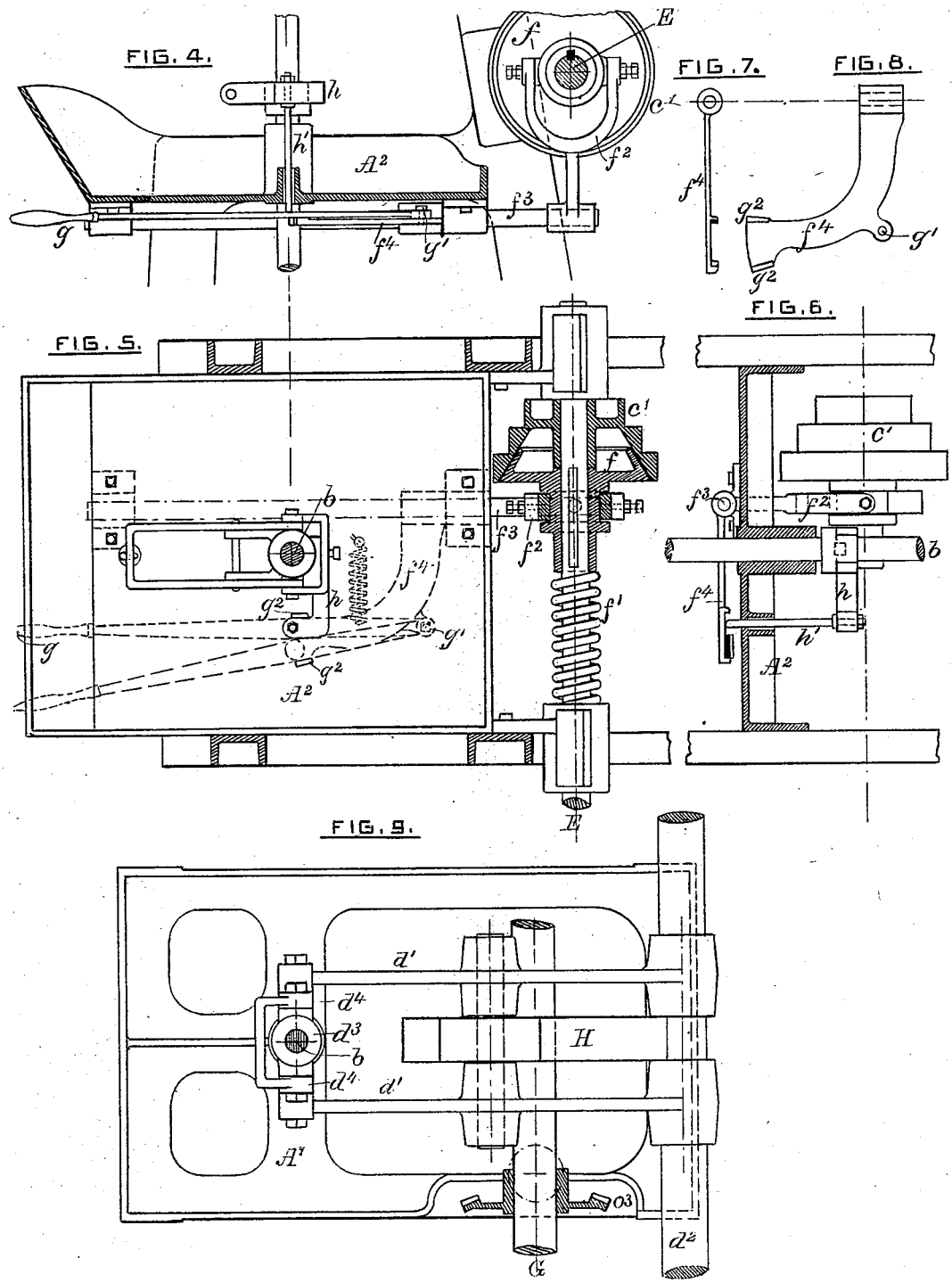

UNITED STATES PATENT OFFICE.

RUDOLF EICKEMEYER, OF YONKERS, NEW YORK.

HAT-STRETCHING MACHINE.

SPECIFICATION forming part of Letters Patent No. 256,203, dated April 11, 1882.

Application filed January 10, 1882. (No model.)

*To all whom it may concern:*

Be it known that I, RUDOLF EICKEMEYER, of Yonkers, in the county of Westchester and State of New York, have invented certain new and useful Improvements in Hat-Stretching Machines; and I do hereby declare that the following specification, taken in connection with the drawings furnished and forming a part of the same, is a clear, true, and complete description of the several features of my invention.

The principal object of my present invention is to render the operation of stretching hat-bodies wholly automatic, so that one attendant may operate several machines, or one such machine, while also attending to other automatic machines for performing other requisite operations upon hat-bodies in their regular sequence or order. One of my machines having been properly adjusted by a skilled workman may thereafter be operated by a comparatively unskilled attendant, because the machines are so organized that the liability of injuring a properly-prepared hat-body is reduced to a minimum.

As preferably organized by me, my machine embodies tip-stretching devices which operate on what is known as the "corrugation" principle; but certain features of my invention are equally applicable for use with tip-stretching devices operating upon the "radial-expansion" principle.

Although the automatic feature is extremely valuable, I do not limit my invention to a machine which is wholly automatic, because certain novel combinations of mechanism devised by me and embodied in my automatic machine may be profitably otherwise employed in various ways, as hereinafter indicated.

In my present machine I employ supporting-ribs which are gradually lifted automatically into progressively closer relations with the tip-stretching fingers, and have combined therewith mechanism by which the hat-body is rotated axially during the stretching operation, the brim of said hat-body being clamped by a rotating clamping-ring which not only rotates the hat, (heretofore done by hand,) but also with proper force pulls the hat-body downward upon the supporting-ribs, thus greatly facilitating the stretching operation. I have also so organized my machine that when the proper degree of stretching has been applied to a hat-body the machine automatically stops in a position permitting the ready removal of a stretched body and the insertion of another.

The tip-stretching devices now employed embrace, when specially considered, more or less of the subjects of invention shown and described in Letters Patent of the United States No. 46,553, February 28, A. D. 1865; No. 53,661, April 3, 1866; No. 91,730, June 22, 1869; No. 140,903, July 15, 1873; No. 167,391, September 7, 1875; No. 168,731, October 11, 1875; No. 200,034, February 5, 1878; and No. 206,168, July 23, 1878, to all of which reference may be had for further information as to features not novel in my present machine.

After a full and detailed description of my new machine the features deemed novel will be specified in the several claims hereunto annexed.

Referring to the five sheets of drawings, Figure 1, Sheet 1, is a central vertical section of my machine with the stretching devices in position as while stretching a hat-body. Fig. 2, Sheet 2, is a view partially in front elevation and partially in section of the machine with its parts in position ready for the reception or removal of a hat-body. Fig. 3, Sheet 3, is a rear elevation of the machine with its parts in position as in Fig. 1. Figs. 4 to 9, inclusive, Sheet 4, represent in various views detached portions of the machine which relate to the lifting of the supporting-rib and stop-motion. Figs. 10 to 34, inclusive, Sheet 5, represent in various views detached portions of the machine which relate to clamping and rotating the hat-body.

The frame of the machine is constructed of cast-iron and designed with due reference to the proper mounting of the several working parts. As clearly shown in Figs. 1, 2, and 3, it is composed of two heavy side plates, A, and three cross-pieces, A', A², and A³, respectively located near the bottom, midway, and top of the frame, said frame being similar to that shown in my prior Letters Patent, No. 200,034, hereinbefore referred to.

The set of stretching-fingers B are as heretofore patented, and are rapidly reciprocated vertically, as shown in my Letters Patent No. 167,391, by means of a cross-head, $a$, side rods, $a'$, links $a^2$, and crank-shaft $a^3$.

The supporting-ribs or skeletonized "former" C in itself is as heretofore patented, and is mounted upon a spindle, $b$, as shown in my Letters Patent No. 206,168, and, as therein described, it is of such form as will permit a hat-body to be freely rotated thereon.

The stretching-fingers and the former constitute the upper and lower co-operating stretching devices, and their construction and arrangement may be largely varied, and nevertheless be successfully employed in connection with more or less of the valuable features of my present invention.

The spindle $b$ has slide-bearings located centrally in the frame cross-pieces A′ and A². The former C is shown at its lowest position for the reception of a hat-body in Fig. 2. From said lowest point the former is promptly lifted, so that it will be in such relations with the stretching-fingers B that the latter commence to co-operate therewith in stretching a hat-body mounted on the former, and from that point it gradually rises for a short distance as the stretching operation progresses, and when this latter is completed the former descends to its original position, and there remains until the stretched hat-body is removed and another placed upon the former, the stretching-fingers being meantime rapidly reciprocated vertically by the constant rotation of the crank-shaft $a^3$, which is connected by the belt $a^4$ to the driving-shaft D, which at one end is provided with a fast and a loose pulley, and is mounted in bearings in the upper portion of the frame.

Although I deem it preferable that the former be moved to and from the reciprocating fingers, the latter, while reciprocating, may be moved downward and upward to and from a stationary former, as illustrated in my Letters Patent No. 167,391, in which case, in accordance with certain portions of my present invention, said up and down movements of the reciprocating fingers would be automatically effected and caused to rest at their highest position after operating upon a hat-body to admit of its removal and the placing of another body upon the former. These variations in the character and arrangement of the stretching devices require obviously corresponding variations in the mechanism now devised by me for effecting the rotation of the hat-body during the stretching operation, and for stretching the same downward upon the former.

The intermitting reciprocating and variable movements of the former and its spindle, being quite slow, are provided for as follows: Upon the driving-shaft D is a cone-pulley, $c$, which is belted to a cone-pulley, $c'$, loosely mounted upon but connected by means of a friction-clutch to a counter-shaft, E, at one end of which is a small gear, $c^2$, meshing with a larger gear, $c^3$, on shaft F, having at its opposite end a small gear, $c^4$, which meshes with a larger gear, $c^5$, on a cam-shaft, G, near the bottom of the machine.

On the cam-shaft G is a cam, H, upon the upper surface of which rests a friction-roller, $d$, which is mounted upon a shaft attached to and between two twin levers, $d'$, pivoted at their rear ends to a rock-shaft, $d^2$, and at their front ends connected to the former-spindle by means of a cross-head, $d^3$, and links $d^4$, as clearly shown in Figs. 1, 2, 3, and 9. The cam H is rotated as indicated by an arrow thereon in Fig. 1. As there shown, the former-spindle is at its full height, and is there maintained until the point $e$ reaches the roller $d$, whereupon said spindle is fully lowered. The rise on the cam up to $e'$ quickly lifts the spindle—say about seven inches—to the point where the former and the stretching-fingers will be in co-operative relations. The gradual rise from $e'$ to $e^2$ slowly lifts the former about one-half inch after the stretching-fingers have commenced to operate, and from $e^2$ around to $e$ is the dwell of the cam, during which the stretching-fingers continue to operate. The fall and the quick rise of the cam together occupy about one quarter of its rotation, the slow rise another quarter, and the dwell the remaining half thereof. The descent of the spindle operates a stop-motion for throwing the shaft G out of gear and stopping the rotation of the cam H, thus causing the former to rest until again required.

The cone-pulley $c'$, loosely mounted on shaft E, as before stated, is provided with a friction-clutch embodying an internal sliding cone, $f$, splined to the shaft, a heavy expansive spiral spring, $f'$, encircling shaft E, and a forked shipper-lever, $f^2$, connected with the hub of the friction-cone $f$ in a manner common to clutches. When the spring $f'$ is permitted to force the cone $f$ into cone-pulley $c'$ the pulley and shaft E are rotatively connected, and when said friction-cone is forced against its spring the cone-pulley runs loosely. The forked shipper-lever $f^2$ is at its lower end mounted upon a horizontal rock-shaft, $f^3$, having a curved lever, $f^4$, extending horizontally to the one side of said rock-shaft, as clearly seen in Figs. 2 to 8, inclusive. To this curved lever $f^4$ a hand-lever, $g$, is pivoted at $g'$, and this projects to the front of the machine, beneath the cross-piece A² of the frame. Said hand-lever is capable of being moved to and fro horizontally on its pivot, between two vertical lugs, $g^2$, on the upper surface of lever $f^4$ at its outer end. A retractile spiral spring (shown in Fig. 5) is connected to the hand-lever and to the under side of cross-piece A², so as to normally maintain said hand-lever against the lug $g^2$ nearest the rock-shaft $f^3$. It will now be seen that if the lever $g$ be depressed by hand it will depress the outer end of the curved lever, cause the rock-shaft to turn and the forked shipper-lever to swing, so as to disengage the friction-cone from the cone-pulley, and thus cause the shaft E to rest. This operation is automatically effected by the spindle, as it descends by means of a horizontal arm, $h$, projecting from said spindle, and a rigid pendent rod, $h'$, extending from the outer end of said arm downward through a hole in the cross-piece A², so that as the spindle descends the end of said rod $h'$ strikes upon the top side of the hand-lever adjacent to but beyond the outer end of the curved lever, the weight of said spindle and its accompanying parts being sufficient to throw the clutch out of gear, and thus hold it until the hand-lever is moved outwardly by hand to permit the curved lever to be freed from the weight of the spindle, and therefore free to rise and to permit the clutch to again re-engage with the cone-pulley.

It is obvious that the stop-motion may be largely varied in its construction and arrangement, and I do not limit myself to any particular variety of clutch, nor in fact to a clutch, except as hereinafter indicated, because approximately valuable results may be obtained if a spring-shipper be employed to shift a belt from a fast to a loose pulley, although such would not be so prompt and effective as when clutches are employed; but with such a shipper the cam-shaft G should be counterweighted, or otherwise so balanced as to assure the stoppage of the cam with its open side upward, and thus cause the spindle and former to always rest at their lowest position. Although I prefer that the stretching-fingers should not be affected by the operation of the stop-motion, because of their rapid movement, they may also be stopped and started with the former-spindle with approximately desirable results.

The ribbed former C is shown in side and top views in Figs. 20 and 21. It is mounted on a base-plate, $i$, (shown in top and sectional views in Figs. 18 and 19,) these being connected together and non-rotatively mounted upon the upper end of the spindle $b$. Beneath the base-plate $i$, and loosely mounted on said spindle, is an annular bearing, $k$, connected to a hub by radial arms, as clearly seen in top and sectional views, Figs. 22 and 23. Upon said annular bearing $k$ there is mounted an annular clamping-ring, $l$. (Shown in section and in top view in Figs. 33 and 34.) The outer surface or periphery of this clamping-ring is inclined, as shown in Fig. 33, for co-operation with an upper clamping-ring, $m$, the inner annular surface of which is similarly inclined, so as to enable a hat-brim to be firmly clamped between said surfaces, as will be hereinafter more fully explained.

As thus far described, it will be seen that the lower clamping-ring, $l$, is free to be revolved either on or with its bearing $k$. Below the hub of said bearing is a cross-head, $n$, Figs. 24, 25, and 26, loosely mounted on the spindle, and with said annular bearing resting thereon is free to slightly rise and fall on said spindle. This cross-head is supported on a pair of links, $n'$, (made in one piece, Figs. 27 and 28,) pivoted to a double lever, $n^2$, Figs. 29 and 30, at its rear end, and said lever is fulcrumed by its rod $n^3$ upon two arms, $h^2$, projecting forward, Figs. 31 and 32, from the hub of the forked arm $h$, previously referred to, which is rigidly secured to the spindle $b$. To the outer end of lever $n^2$ a weight-plate and weights, $n^4$, are suspended by means of a rod-hook, $n^5$, so that said weights serve to hold the lower clamping-ring, $l$, in its most elevated position, and at the same time will permit said ring to be forced downward when downward pressure is applied thereto sufficient to overbalance the weights $n^4$.

The upper clamping-ring, $m$, Figs. 16 and 17, has a pair of ears, $m'$, drilled for the reception of screws or bolts by which to readily attach said ring to the under side of its annular weight $m^2$, Figs. 14 and 15. It will be readily seen that if the hat-body be placed over the former, with the lower clamping-ring inside the hat, and the outer clamping-ring and its weight be placed over the hat, the latter will be tightly clamped adjacent to its brim, and that in proportion as the weight $m^2$ is enabled to overcome the weight $n^4$ will the hat-body be pulled downward upon the ribbed former, thus stretching it in lines radiating from the center of the tip toward the brim while the stretching-fingers are stretching on peripheral or circular lines. This radial line-stretching has always been heretofore done by hand during the operation of the stretching-fingers and while the hat has been rotated by hand and pulled downward upon the former.

The weight $n^4$ and the lever and links may be dispensed with if a heavy spiral expansive spring encircling the spindle $b$ be placed below the hub of the annular bearing $k$, with an interposed collar or washer, and provided with a base-nut on the spindle, the latter being properly threaded to receive it, so that by turning said nut up or down the expansive or lifting power of said spring could be varied.

This arrangement of clamping and stretching rings with the stretching-fingers is of value, even if the rotation of the clamp be effected by hand; but I have provided for its rotation mechanically as follows: The upper cross-piece, A³, of the frame, as seen in Fig. 10, is of such form as to afford a circular opening therein, the center of which is coincident with the axes of the spindles upon which the stretching-fingers and former are respectively mounted. Around the inner edge of this opening is a raised annular bearing, $o$, upon which a gear-ring, $o'$, annularly rabbeted, is rotatively mounted, and to this gear-ring the clamping-weight $m^2$ is loosely secured by pendent bolts $m^3$, as clearly indicated in Figs. 12, 13, and 14, so that although the weight will be rotated it will also be free to rise and fall upon its bolts.

The gear-ring $o$ and the weight $m^2$, with the upper clamping-ring, are revolved by means of a vertical shaft, $o^2$, geared by bevel-gearing $o^3$ to the cam-shaft G, as seen in Fig. 3, and having at its upper end a pinion, $o^4$, meshing with a loose gear, $o^5$, which in turn meshes with and drives the gear-ring $o'$. It will now be readily seen that when the cam-shaft is at rest the upper clamping-ring does not rotate;

but this involves merely somewhat less power and wear of the gearing, and so far as relates to its practical operation it might as well be continuously rotated—as, for instance, by gearing from the upper shaft, D.

It is not absolutely essential that power be applied to the upper clamping-ring for rotating the hat-body, because if the ribbed former be stationary, as hereinbefore indicated, power may be applied to the lower clamping-ring, the upper one and its weight being pendently mounted, so as to be rotated freely when so far lowered as to be in clamping relations with the rotating lower ring when a hat-body is interposed between them.

Different sizes of hats require of course a variation in the size of the former and diameter of clamping-rings, and therefore these are so constructed as to be readily applied and removed. In working the machine the stretching-fingers as a whole are continuously operated at from two hundred to three hundred vibrations per minute. The former, being at rest, as shown in Fig. 2, and at its lowest position, receives a hat-body properly heated and moistened. The hand-lever $g$ is then moved to one side, which permits the clutch to engage and rotate the cam-shaft G, whereupon the former rapidly rises until the hat-body is clamped by the rings and slowly rotated on the former, and the latter continues to rise until the hat-body is subjected to the action of the stretching-fingers, after which the former is further elevated slowly to the extent of about half an inch, the hat-body continuing to rotate, thus continuously presenting new surfaces to the action of stretching devices until, the cam-shaft having made a complete revolution, the former is lowered and rests with the hat thereon properly stretched, not only peripherally in circular lines, but also in radial lines, extending from near the brim up the "square" to the center of the tip. By nearly balancing the annular weight $m^2$ by the lever-weights $n^4$ the downward pull on the hat-body will be reduced to a minimum, and by lessening weight $n^4$ said pulling effect will be increased. For merely rotating the hat body, the annular weight $m^2$ need be but little, if any, heavier than weight $n^4$, to provide for the proper clamping effect.

While it is preferable, for the best results, to have the machine organized substantially as shown, certain portions of my invention may be profitably employed independently of others—as, for instance, the former may be raised by the foot of the attendant applied to a treadle, as heretofore, the stretching-fingers and rotating clamping-ring operating therewith, as described; or the clamping-rings may be rotated by hand during the stretching operation to more readily enable the rotation of the hat-body than if grasped by the hand, and to permit the weighted clamping-ring to pull downwardly on the hat-body.

Although I have shown and described the several features of my present invention as embodied in a tip-stretching machine, it is to be understood that certain portions of my invention are applicable to machines adapted wholly to the stretching of brims, and especially such as embody rapidly-reciprocated stretching-fingers, as illustrated in my Letters Patent April 11, 1876, No. 175,953. I have successfully organized in an automatic brim-stretching machine several of the features of invention hereinbefore described, which, briefly stated, relate to the automatic placing of the stretching devices—i. e., the fingers and the former—into and out of working relations with each other, and the stop-motion embodying the friction-clutch automatically controlled by the former-spindle. In the brim-stretching machine, however, the former is of necessity constructed differently from the tip-stretching former hereinbefore described; and the same is true of the stretching-fingers employed respectively for brim and tip stretching; but the fingers and former may even be of that complex variety heretofore patented by me for simultaneously stretching tips and brims, and nevertheless be successfully employed in connection with such features of my present invention as are not necessarily limited to tip-stretching machines. Briefly stated, the features which are limited to tip-stretching include the clamping-rings with or without their rotating mechanism, it being obvious that such rings cannot be employed in a brim-stretching machine, because, instead of having the brims clamped, they must be fully exposed to the action of the stretching devices, and although the hat-body must be rotated in automatic brim-stretching machines I have had to devise wholly novel mechanism for that purpose. It will therefore be understood that I do not now limit myself to tip-stretching fingers and a former for co-operating therewith, except as specifically indicated in the claims hereunto annexed.

Having thus described my invention, I claim as new and desire to secure by Letters Patent—

1. The combination, substantially as hereinbefore described, of rapidly-reciprocated stretching-fingers and a ribbed support for a hat-body, automatically placed into and out of working relations with each other and caused to gradually approach each other automatically during the stretching operation.

2. The combination, substantially as hereinbefore described, of rapidly-reciprocating stretching-fingers and a ribbed former which is automatically raised, with a hat-body thereon, to the stretching-fingers, gradually lifted after said fingers commence their stretching action, and then lowered for the removal of a stretched hat-body.

3. The combination, substantially as hereinbefore described, of rapidly-reciprocated stretching-fingers and a ribbed support for a hat-body, automatically placed into and out of working relations with each other, and a stop-motion for maintaining them out of working relations after each stretching operation for the ready insertion and removal of a hat-body.

4. The combination, substantially as hereinbefore described, of stretching-fingers, a former which is automatically lifted to and lowered from the stretching-fingers, and a stop-motion which causes the former to rest in its lowest position after each reciprocation.

5. The combination, substantially as hereinbefore described, of tip-stretching fingers, a former, and clamping-rings by which a hat-body may be readily rotated during the stretching operation.

6. The combination, substantially as hereinbefore described, of tip-stretching fingers, a former, and weighted clamping-rings by which a hat-body may be readily rotated and stretched by the downward pull of the weighted rings.

7. The combination, substantially as hereinbefore described, of tip-stretching fingers, a former, and a clamping-ring mechanically rotated.

8. The combination, substantially as hereinbefore described, of tip-stretching fingers, a former, and weighted clamping-rings which are adjustable for varying the downward pull on a hat-body.

9. The combination of the tip-stretching fingers, the former and its spindle, the clamping-rings, the upper clamping-weight, and the adjustable weight and its lever connected with the lower clamping-ring, substantially as described.

10. The combination of the rapidly-reciprocating stretching-fingers, the ribbed former, its spindle, the levers, and the cam for reciprocating the former, substantially as described.

11. The combination of the hat-stretching fingers and former and a friction-clutch automatically controlled by the former-spindle for causing the latter to rest when at its lowest position, substantially as described.

12. The combination, with the tip-stretching devices, of clamping-rings readily attached and removed, substantially as described, for enabling adjustment of the machine to operate on hats of various diameters, as set forth.

RUDOLF EICKEMEYER.

Witnesses:
HENRY OSTERHELD,
GEORGE NARR.